Dec. 27, 1966     G. THOMAS     3,294,150
SUNBLINDS FOR GREENHOUSES OR THE LIKE
Filed Dec. 20, 1963     3 Sheets-Sheet 2

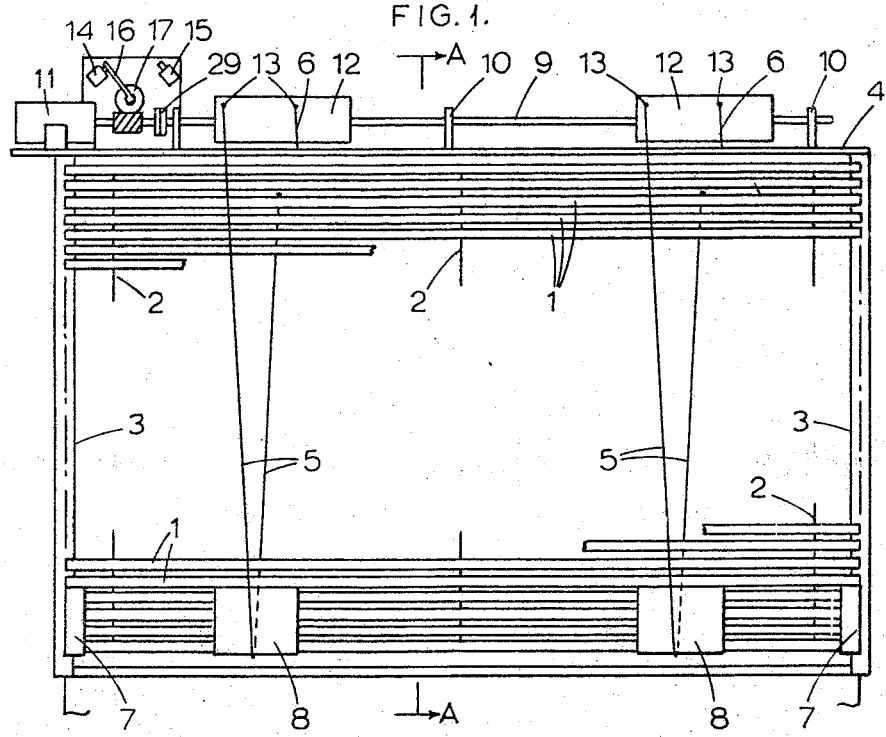
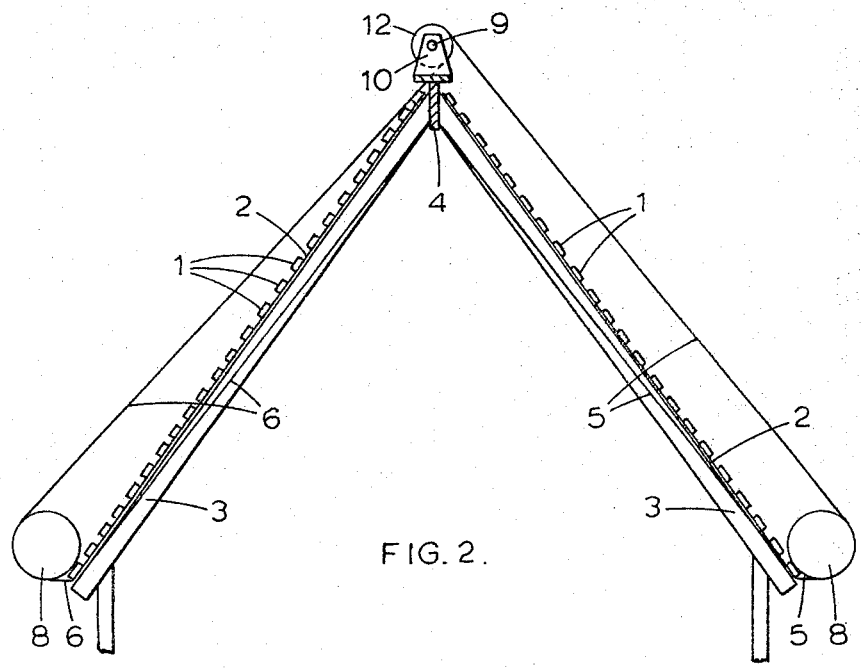

Dec. 27, 1966   G. THOMAS   3,294,150
SUNBLINDS FOR GREENHOUSES OR THE LIKE
Filed Dec. 20, 1963   3 Sheets-Sheet 3

United States Patent Office 3,294,150
Patented Dec. 27, 1966

3,294,150
SUNBLINDS FOR GREENHOUSES OR THE LIKE
George Thomas, 98 Rushes Road, Petersfield, England
Filed Dec. 20, 1963, Ser. No. 332,115
Claims priority, application Great Britain, Jan. 2, 1963,
278/63; Apr. 3, 1963, 13,142/63
7 Claims. (Cl. 160—5)

The invention relates to arrangements for controlling blinds, such as sunblinds, in accordance with variations in conditions, for example, temperature or light intensity or both. Although not so limited, the invention relates particularly to sunblinds for greenhouses or other structures or enclosures in which it is desirable to control the entry of solar radiation and maintain the temperature within certain predetermined limits. In nurseries or the like it is normally possible to give more-or-less continuous attention to temperature regulation by the adjustment of blinds and/or ventilators of the greenhouses in accordance with variations in sunshine or wind; in other cases such continuous attention is not feasible and it is the main object of the present invention to secure, under these conditions, automatic regulation of temperature.

It is another object of the invention to provide means for bringing a blind from an operative to an inoperative state or vice versa in dependence on variations in a sensed condition or conditions, such as temperature and or light intensity.

It is also an object of the invention to regulate the incidence of solar radiation on an enclosure such as a greenhouse in accordance with the light intensity falling thereon and/or the temperature therewithin.

In accordance with the invention, actuation of a sunblind fitted to a greenhouse or the like to bring it to its operative or inoperative position can be effected by means of a reversible electric motor controlled, as regards its direction of rotation, by switch means, action of which is effected through a thermostat responsive to a variation in temperature which it is desired to limit and/or through a photocell responsive to the light intensity at the greenhouse.

A suitable form of blind for this purpose comprises a series of slats, mounted on lengths of cord, webbing or like flexible members, which are operative to provide shade by being unrolled over the roof of the greenhouse or, by being rolled up, are rendered inoperative so that admission of sunlight is uninterrupted.

Normally the thermostat will be located within the greenhouse, but other positions could be selected. The photocell will normally be located so as to receive light of the intensity of that received by the greenhouse.

In order that the invention may be clearly understood and readily carried into effect, it will now be described more fully with reference to the accompanying drawings which illustrate, by way of example, forms of apparatus in accordance therewith. In the drawings, like parts are indicated by like reference numerals, and FIGURE 1 is a view of one side of a greenhouse roof to which the controlled blind of slat form is applied;

FIGURE 2 is a section on the line A—A of FIGURE 1;

Figure 3:
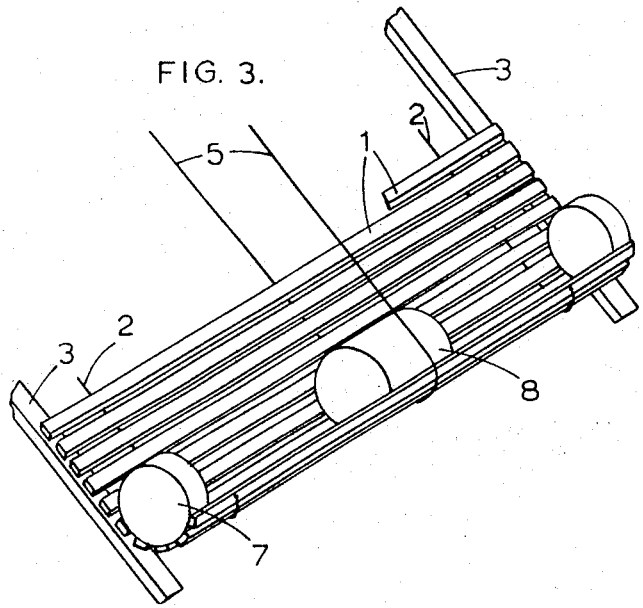
FIGURE 3 is a fragmentary view showing the mode of operation of the blind.

Referring to FIGURES 1 to 3 of the drawings, each blind is of known construction comprising a series of slats 1, of wood or other suitable material, mounted on lengths of cord 2, and rests, when in the unrolled operative position shown, on the roof members 3. The upper edge of each blind is attached to the ridge bar 4 of the roof.

For the purpose of rolling up the blinds, they are respectively provided with cords or the equivalent 5, 6, each attached at one end to the bar 4 and lead around the lower end of its blind as unrolled and back outside the latter to the mechanism whereby rolling is effected.

In order that the blinds shall roll up neatly in cylindrical form, each is provided at its ends with short cylinders 7 and intermediately, at locations corresponding with the cords 5 and 6, with cylinders 8: any or all of these cylinders may be made of appreciable weight in order, by the action of gravity, to facilitate unrolling of the blinds. Conveniently, the lowermost slat is made square in cross-section for reception in an axially extending slot in the surface of the cylinders 7 and 8. By comparison of FIGURES 1 and 3, it will be noted that the number of cords 5 and 6 and of cylinders 8 provided for each blind may be varied in accordance with the width of the blind.

For the purpose of rolling and unrolling the blinds by means of the cords 5 and 6, there is provided a reversible electric motor serving, through the agency of gearing, including a worm gear, to rotate a spindle 9 supported in bearings 10 mounted on the ridge bar. Besides reducing the drive speed of the motor a suitable amount, the worm gears serves to hold the blind in its rolled up position. The motor, its gearing and devices for controlling the motor are contained within a casing 11 also mounted on the bar 4.

On the spindle 9 there are mounted drums 12, corresponding in number to the number of pairs of cords 5 and 6 to each drum the outer ends of these cords are attached as indicated at 13. Thus, on rotation of the spindle 9, the drum 12, or each drum if more than one be employed, serves to wind the cords 5 and 6 attached to it around itself, so rolling up the blinds or allowing them to unroll according to the direction of rotation of the spindle. In order that the cords shall be coiled in an even helix, thereby avoiding entanglement of the cords either in the members or with the slats 1, each drum is made of sufficient width and the attachment point 13 of each cord is offset in the longitudinal direction to the point of attachment of its other end to the bar 4.

In some cases the drums 12 may be dispensed with, the cords 5 and 6 being attached to, and coiled around, the spindle 9.

Figure 4:
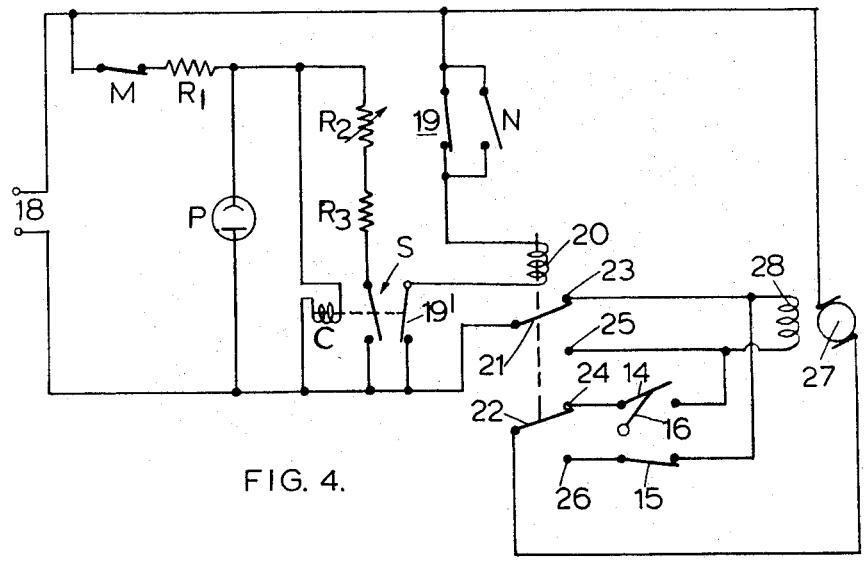
FIGURE 4 is a circuit diagram of a control system for the electric motor.

In order that the electric motor may be stopped when the blinds are completely rolled or unrolled, limit switches 14 and 15 are provided, each being held in its closed position by a spring. A rocking arm 16, however, serves to open one switch or the other as required, this arm being oscillated through worm gear 17 on operation of the motor in one direction or the other. FIGURE 4 shows the circuit of a control system for the electric motor including the limit switches 14 and 15 and elements responsive to two independently varying conditions, temperature and light intensity. The system can however be operated satisfactorily with a single element and means are provided for option exclusion of either of the elements from the circuit, whereby a control system is obtained which is responsive only to changes in temperature or only to changes in light intensity. By provision of the circuit modified by the exclusion of the appropriate condition-responsive means, a system which is permanently responsive to one condition only, can be obtained.

Referring to the control circuit of FIGURE 4, across the supply mains 18 there is connected, in series with switches 19 and 19', the coil 20 of a relay whereof the armature carries two double contacts 21, 22. The switches 19 and 19' are condition-controlled, that is, each is arranged to be opened or closed in dependence on predetermined changes in a respective condition in a manner to be described.

As regards the relay, on excitation of the coil 20 when the switchces 19 and 19' both are closed, the contacts 21 and 22 are caused to bear respectively on contacts 23 and 24 as shown; conversely, on opening of one or other of the switches 19 and 19', the coil 20 is de-energised and the contacts 21 and 22 are drawn by springs against contacts 25 and 26 respectively.

In the example illustrated, a series-wound D.C. motor has been assumed, and it will be evident that, in both operative positions of the contacts 21 and 22, the armature 27 is connected to the mains 18 in the same direction. However, on change of the contacts 21, 22 from the contacts 23, 24 to the contacts 25, 26, supply to the field windings 28 will be reversed, with corresponding reversal of the direction of rotation of the armature 27.

Excitation of the coil 20 is under control of the switches 19 and 19' and will take place when the sensed conditions are such that both switches are closed. Contacts 21, 22 will then assume the position shown and rotation of the motor will be in such a direction as to unroll the blinds. When this action is completed, the limit switch 14 is opened by the arm 16, thus disconnecting the motor from the mains. On a change in one of the sensed conditions sufficient to cause switch 19 or 19' to open, the coil 20 is de-energised and the contacts 21 and 22 caused by the springs to bear on contacts 25 and 26. Circuit is then completed through the limit switch 15 and the motor restarted in the direction effective for unrolling up the blinds; on completion of this action, the switch 15 is opened and the motor disconnected. The cycle of operations will then be repeated as soon as conditions cause both switches 19 and 19' to be closed, and one of them subsequently to be opened.

In the circuit illustrated, the switch 19 is controlled by temperature-responsive means. The switch can be of any thermostatic type arranged to open and close when a temperature being sensed reaches predetermined and preferably adjustable limits. In its simplest form, the switch is one which is arranged to close against a spring when a predetermined adjustable temperature is exceeded and to be opened by the spring when the temperature sensed falls below the predetermined level.

The switch 19' is a microswitch responsive to light intensity, that is, arranged to open when the intensity of incident light falls below an adjustable predetermined level and to close when it exceeds the same or a different adjustable predetermined level. In the arrangement shown, the controlling light intensity falls upon the photocell P which is connected across the mains 18 in series with resistor $R_1$. In parallel across the photcell P are firstly a variable resistor $R_2$ or fixed resistor $R_3$ and with the contacts of microswitch S, and secondly a relay coil C of which the armature comprises arms controlling switches S and 19'. When the light incident on the photocell P is of sufficient intensity to render the cell conductive, the high voltage drops across $R_1$, makes the voltage across the coil C insufficient to energize the relay; switch S is then held open and switch 19' allowed to close as shown.

If the light intensity drops, so that the photocell becomes non-conductive, the voltage drop across $R_1$ is reduced and the relay coil is energized, closing switch S and opening switch 19'. Closure of switch S brings series-connected resistors $R_2$ and $R_3$ in parallel with the coil C, so reducing the holding current of the relay. The closing and reclose voltages of the relay are thus different and can be adjusted by adjustment of the variable resistor $R_2$, so that there is an adjustable difference between the light intensities required to obtain opening and closing of switch 19'. Switches S and 19' should be microswitches because the snap action of microswitches eliminates contact trouble when the light intensity is changing gradually. The opening light intensity of the photocell can be varied by altering the amount of permanent shade it receives.

Although the system described and illustrated in FIGURE 4 incorporates two independently operating sensing elements, it is possible to control the blinds in accordance with the invention by means of a system having only a single condition responsive element. The circuit of FIGURE 4 includes a switch M in series with resistor $R_1$ which can be opened if it is desired to operate the system as a system responsive to temperature only. Opening the switch M disconnects the photocell P and its associated components from the mains 18; coil C is necessarily de-energized and switch 19' is automatically closed. Alternatively, the circuit provided can be that of FIGURE 4 modified by omission of the components P, $R_1$, $R_2$, $R_3$, C, S, and 19', the last-mentioned being replaced by a permanent connection. The motor driving the blinds is then in either case controlled by thermostatic switch 19 only, so that the blinds are rolled up, when the temperature within the greenhouse falls below predetermined level and unrolled when the predetermined temperature level is exceeded, whatever the intensity of the incident light It is equally possible to operate the system as one responsive to light intensity only. The circuit includes a switch N in parallel with switch 19. By closing switch N, switch 19 is rendered ineffective to control energisation of coil 20 and, switch M being closed, control of the system rests with the switch 19', which is opened or closed in response to changes in light intensity. Alternatively, it is possible to provide a circuit similar to that of FIGURE 4 but modified by replacement of the thermostatic switch 19 by a permanent connection. In either of the two last-mentioned instances, the blinds will be rolled up when the incident light intensity falls to a predetermined level and unrolled when it increases to such a level, regardless of temperature.

Thus, three control systems have been described, namely, (1) the overall system of FIGURE 4 whereby the blind is kept in the operative, shade-providing condition only as long as both temperature and light intensity remain above respective predetermined levels, (2) a modification of the system of FIGURE 4 to render switch 19' ineffective whereby control is responsive to temperature alone, and (3) a modification of the system of FIGURE 4 to render switch 19 ineffective whereby control is responsive to light intensity alone. The relative advantages and disadvantages of these three control systems are that (i) with the dual control of temperature and light intensity as described above, there is the advantage that the blind will return to the rolled-up condition as soon as either the temperature or light intensity falls below the respective predetermined level. This is particularly advantageous to the normal situation at the end of a sunny day when light intensity decreases before air and ground temperatures fall, so that solar heating is utilized to the full when it is declining anyway. This operation does not arise in the case of temperature alone since the shade would not roll up until the temperature within the shaded zone fell below the relevant predetermined value, by which time, at the end of a day, there would be virtually no useful solar energy available. Correspondingly, (ii) at the beginning of a sunny day the dual control system as described above is equally advantageous in that the blind is not unrolled to provide shade until both the light intensity and temperature exceed their respective predetermined levels and so solar heating is employed to elevated the temperature within the greenhouse more rapidly than would otherwise be the case. This effect is, on the other hand, not achieved with control by light intensity alone, since the blind would provide shade immediately the light intensity exceeded the chosen level, irrespective of temperature, so that useful solar heat would be denied to the greenhouse interior. Therefore, by taking account of both (i) and (ii), it will be seen that dual control in response to both temperature and light intensity provides advantageous operation relative to control by either one of such conditions alone.

Figures 5, 6:
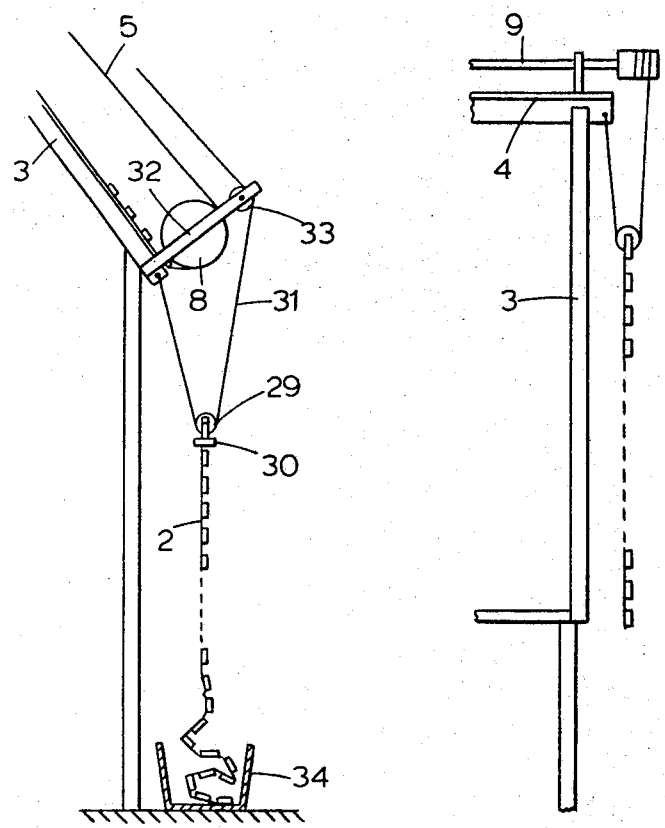
FIGURE 5 is a partial end view of the greenhouse showing the controlled blind applied to a side wall.
FIGURE 6 is a partial side view of the greenhouse showing the controlled blind applied to an end wall.

FIGURE 5 shows the invention applied also to the sidewall of the greenhouse. Instead of being rolled or unrolled up and down on inclined supports constituted by the roof members 3, the blind here is raised or lowered generally vertically from a storage position at or below the lowest level of the transparent part of the side wall. To this end, a pulley 29 is rotatably secured to the uppermost slat 30 of the blind and a winding cord 31 is entrained around the pulley. A post 32 projects outwardly from the greenhouse at the point where the side walls meet the roof and a guide pulley 33 is rotatably secured to its outer end. One end of the winding core is secured to the post 32 and the cord extends downwardly from this end, round the first pulley 29, upwardly over the guide pulley 33 and from there towards a drum, mounted on the shaft 9. The other end of the cord 31 is attached to this drum, so that rotation of shaft 9 to draw in the cords 5 will wind out the cord 31, thus rolling up the blinds, on the roof and allowing the sidewall blind to drop. Different lengths of cord will normally require to be wound in and out because the roof and side wall blinds will normally be different in length. The difference can be conveniently provided by the use of winding drums on the shaft 9 of different diameter for the cords 31 and 5. The post 32, is of course, made of sufficient length for the cord 31 to clear the sunblind and associated parts of the adjacent roof.

In the raised position of the blind, the slats depend by means of the cord 2 from the uppermost slat 30, to which the first pulley 29 is secured. In the lowered position the slats are collapsed one upon the other at the storage position, in a trough-like container 34. Rotation of the winding shaft 9 in a direction to raise and extend the side-wall blind will draw up the first pulley 29 and thus pull the slats up one after the other from the storage container 34 until the complete blind hangs vertically from the first pulley. Rotation of the winding shaft 9 in the opposite direction will allow the blind to fall by its own weight slat by slat into the container 34 until the side wall is completely exposed, except for the parts of the winding cord 31 entrained around the first pulley 29.

Instead of the trough-like container 34, cylinders could be provided at the foot of the wall and the slats wound therearound in the lowered position of the blind. The cylinders would resemble the cylinders 7 and 8 in being attached to the lowermost slat of the blind but they would be journalled for rotation about their common axis on fixed supports and urged by a spring to rotate in the direction to wind down the blind. The force applied by the spring would of course be arranged to be considerably less than that exerted by the motor to raise the blind.

The arrangement of FIGURE 5 has been described in respect of the sidewall of a greenhouse having the blind arrangement of FIGURE 2 applied to the adjacent roof, but it is to be understood that the former arrangement could exist independently, for example, where the building has an opaque roof which requires no blinds. The winding shaft 9 and the winding drum could then be positioned with their axes at about the location of the axes of the guide pulley 33, which would not of course then be required. The central position on the shaft 9 would be preferred if the operation of the winding shaft were to control a pair of blinds on the opposite side walls of the greenhouse.

FIGURE 6 shows the invention applied to the end walls of the greenhouse. The arrangement resembles that of FIGURE 5 particularly as regards the suspension of the blind from pulley 35 attached to the topmost slat 36. The storage means provided for the blind in its lowered position can be the same as for the FIGURE 5 arrangement and is not therefore shown. The difference is that the fixed end of the winding cord 37 is secured at an end of the ridge bar 4 and the other end goes directly to a winding drum 39 on the shaft 9, there being no need in this arrangement of an intermediate guide pulley. The winding drum 38 is mounted at the end of the shaft 9 so as to project beyond the end of the bar 4; entanglement of the two parts of the winding cord is thus avoided. The blind for the end wall will of course be shaped to correspond to the form of the end wall, the individual slats being of different longitudinal dimensions and being fitted together to correspond in overall shape to the shape of the wall. It will be clear that the arrangement of FIGURE 6 can be used on one or both end walls, with or without the roof and/or sidewall blind arrangements previously described.

A coupling 29 may be interposed in the spindle 9 for ready detachment of the motor and its gearing; in that case the spindle may be rotated by hand through the agency of removable crank handle. The casing 11, together, if desired, with the mounting of the switches 14 and 15 and their actuating mechanism, may be made readily detachable for removal, for example, during the winter months.

If the two sides of the roof be of different depths so that the blinds are of unequal lengths, drums of different diameter may be provided for the cords 5 and 6 respectively. In the case of L-shaped greenhouses, a single motor with its control system might be employed, the shafts along ridge bars of the two arms for the house being suitably connected, as by bevel gearing or a flexible coupling.

The invention is not to be regarded as limited to the precise type of blind illustrated; for instance, the slats, instead of incorporation in a structure capable of being rolled up, might be individually pivoted to the roof and collectively tilted, after the fashion of an adjustable louvre ventilator, by the thermostatically controlled motor.

What I claim and desire to secure by Letters Patent of the United States is:

1. A device for controlling a blind for fitting to a greenhouse or the like, the device comprising a reversible electric motor for bringing the blind to an operative state in which it shades a zone within the greenhouse and to an inoperative state in which it does not shade such zone, temperature-condition sensitive means operative to indicate the temperature in said zone relative to a predetermined temperature level, light-condition sensitive means operable to indicate the intensity of light incident on said zone relative to a predetermined light intensity level, and switch means to energise said motor to bring the blind to its operative state in response to both said sensitive means indicating respective conditions exceeding their relevant predetermined levels and to energise said motor to bring the blind to its inoperative state in response to either one of said sensitive means indicating a condition below the relevant predetermined level.

2. A device for controlling a blind for fitting to a greenhouse or the like, the device comprising a reversible electric motor for bringing the blind to an operative state in which it shades a zone within the greenhouse and to an inoperative state in which it does not shade such zone, temperature-condition sensitive means operable to indicate the temperature in said zone relative to a predetermined temperature level, first switch means normally in a first switching state and actuable to second switching state in response to a temperature indication in excess of said predetermined temperature level by said temperature-condition sensitive means, light-condition sensitive means operable to indicate the intensity of light incident on said zone relative to a predetermined light intensity level, second switch means normally in a first switching state and actuable to a second switching state in response to a light intensity indication in excess of said predetermined light intensity level by said light-condition sensitive means, and a first energisation circuit for said motor for operation thereof to bring the blind to its operative state which circuit includes and is closed by both said switch means together in their second switching states.

3. A device according to claim 2 comprising a second energisation circuit for said motor for operation thereof to bring the shade to its inoperative state, which circuit is closed by either one of said switch means in its first switching state.

4. A device as claimed in claim 3 comprising first and second limit switch means to respectively open said first and second energisation circuits in response to attainment of the relevant operative and inoperative state of the blind.

5. A greenhouse having a sunblind adjustable between open and closed positions respectively permitting and limiting entry of sunlight through a light transmitting wall portion into the greenhouse, adjusting means operable to adjust the sunblind from one position to the other, and control means for the adjusting means including a pair of means sensitive to two different conditions influencing temperature within the greenhouse, said pair of means comprising an element sensitive to the temperature in the greenhouse and an element sensitive to light intensity in the greenhouse whereby said control means closes the sunblind when the temperature and light intensity each succeeds a predetermined level, and opens the sunblind when either the sensitive temperature or light intensity falls below a predetermined level.

6. A greenhouse as claimed in claim 5, in which the wall portion is a sloping roof portion of the greenhouse and the sunblind is a flexible member arranged to be opened by unconrolling down the sloping roof portion.

7. A greenhouse as claimed in claim 5, in which the wall portion is a vertical wall of the geenhouse and the sunblind is arranged to be raised from an open position at the foot of the wall to a closed position parallel and adjacent thereto.

References Cited by the Examiner

UNITED STATES PATENTS

| 215,374 | 5/1879 | Lefebure | 160—243 X |
| 466,831 | 1/1892 | Palmer | 160—133 X |
| 597,562 | 1/1898 | Paul et al. | 160—243 |
| 1,978,152 | 10/1934 | Ward | 160—171 |
| 2,041,079 | 5/1936 | Lyle | 160—5 X |
| 2,083,726 | 6/1937 | Mason | 160—5 X |
| 2,149,481 | 3/1939 | Van Bosch et al. | 160—5 X |
| 2,582,276 | 1/1952 | Powers | 160—243 |
| 2,962,647 | 11/1960 | Borenstein | 160—5 X |
| 3,042,001 | 6/1962 | Dubie et al. | 160—5 X |

FOREIGN PATENTS 400,953 10/1923 Great Britain.

HARRISON R. MOSELEY, *Primary Examiner.*

P. M. CAUN, *Assistant Examiner.*